(12) United States Patent
Morath

(10) Patent No.: US 8,798,851 B2
(45) Date of Patent: Aug. 5, 2014

(54) MOBILE CRANE

(75) Inventor: Erwin Morath, Lauterach (DE)

(73) Assignee: Liebherr-Werk Ehingen GmbH, Ehingen/Danube (DE)

( * ) Notice: Subject to any disclaimer, the term of this patent is extended or adjusted under 35 U.S.C. 154(b) by 1762 days.

(21) Appl. No.: 12/077,850

(22) Filed: Mar. 21, 2008

(65) Prior Publication Data

US 2008/0246658 A1 Oct. 9, 2008

(30) Foreign Application Priority Data

Mar. 23, 2007 (DE) .......................... 10 2007 014 114

(51) Int. Cl.
| | | |
|---|---|---|
| B60R 25/30 | (2013.01) | |
| G01S 5/00 | (2006.01) | |
| G01S 19/16 | (2010.01) | |
| B66C 13/40 | (2006.01) | |
| B66C 13/18 | (2006.01) | |
| G07C 5/00 | (2006.01) | |
| G07C 5/08 | (2006.01) | |

(52) U.S. Cl.
CPC ............... B66C 13/18 (2013.01); G01S 5/0027 (2013.01); G01S 19/16 (2013.01); B66C 13/40 (2013.01); G07C 5/008 (2013.01); G07C 5/085 (2013.01)
USPC ................ 701/32.3; 340/426.11; 340/426.19; 701/517

(58) Field of Classification Search
USPC ........... 701/24, 29, 30, 50, 56, 207, 213, 215, 701/300, 2, 29.1, 29.4, 29.6, 31.4, 31.6, 701/32.3, 33.4, 33.5, 408, 517, 521; 340/426.1, 426.11, 426.16, 426.19, 340/539.1, 539.19, 539.21, 539.24, 539.25
See application file for complete search history.

(56) References Cited

U.S. PATENT DOCUMENTS

| | | | | |
|---|---|---|---|---|
| 5,442,553 | A  * | 8/1995 | Parrillo | 455/420 |
| 5,844,473 | A | 12/1998 | Kaman | |
| 6,002,326 | A  * | 12/1999 | Turner | 340/426.1 |
| 6,232,874 | B1 * | 5/2001 | Murphy | 340/426.19 |
| 6,803,854 | B1 * | 10/2004 | Adams et al. | 340/531 |
| 6,985,085 | B1 * | 1/2006 | Brown | 340/685 |
| 7,002,465 | B2 * | 2/2006 | Komatsu et al. | 340/531 |
| 7,065,446 | B2 * | 6/2006 | Chou | 701/472 |
| 7,246,009 | B2 * | 7/2007 | Hamblen et al. | 701/517 |
| 7,355,509 | B2 * | 4/2008 | Rennie et al. | 340/426.16 |
| 7,358,849 | B1 * | 4/2008 | Pesina | 340/426.17 |
| 7,450,004 | B2 * | 11/2008 | Allen et al. | 340/539.22 |
| 7,518,489 | B2 * | 4/2009 | Nelson et al. | 340/426.11 |
| 7,643,890 | B1 * | 1/2010 | Hillen et al. | 700/17 |
| 8,024,084 | B2 * | 9/2011 | Breed | 701/31.4 |

(Continued)

FOREIGN PATENT DOCUMENTS

| | | | | |
|---|---|---|---|---|
| DE | 196 47 131 | | 5/1998 | |
| DE | 198 07 989 | | 9/1999 | |
| DE | 199 14 829 | | 1/2001 | |
| DE | EP1281656 | * | 2/2003 | ............. B66C 13/44 |

(Continued)

Primary Examiner — John R Olszewski
Assistant Examiner — Todd Melton
(74) Attorney, Agent, or Firm — Dilworth & Barrese, LLP.

(57) ABSTRACT

The present invention relates to a mobile crane having means for wireless reception or for the determination of data identifying the location of the crane as well as having transmission means which are in communication with these means or can be connected to them, wherein the transmission means are configured such that they transmit the data identifying the location of the crane from the crane to a receiver in a wireless manner.

20 Claims, 3 Drawing Sheets

(56) References Cited

U.S. PATENT DOCUMENTS

| | | | |
|---|---|---|---|
| 8,102,247 B2* | 1/2012 | Arakawa | 340/426.1 |
| 8,151,118 B2* | 4/2012 | Foster et al. | 713/189 |
| 2002/0055817 A1* | 5/2002 | Chou | 701/207 |
| 2005/0242971 A1* | 11/2005 | Dryer | 340/870.11 |
| 2005/0262498 A1 | 11/2005 | Ferguson et al. | |
| 2008/0284575 A1* | 11/2008 | Breed | 340/438 |

FOREIGN PATENT DOCUMENTS

| | | |
|---|---|---|
| DE | 10 2005 059 768 | 1/2007 |
| EP | 1281656 | 2/2003 |

* cited by examiner

MOBILE CRANE

BACKGROUND OF THE INVENTION

The present invention relates to a mobile crane

In modern cranes, the electronic control in the form of hardware and software plays a substantial role and is becoming more and more important for the efficient use of a crane. The operators of a mobile crane expect both that the crane can work under ideal conditions of use and the possibility of being provided with help fast and efficiently in the event of a problem to reduce any downtime of the crane to a minimum.

It is already known from the prior art to equip mobile cranes with a radio connection, for example with a GSM interface, with which data can be transmitted, facsimiles can be sent or also telephone calls can be made. It is the underlying object of the present invention to further develop a mobile crane such that the means for the wireless data transmission are utilized to be able to use a mobile crane in a particularly advantageous manner.

SUMMARY OF THE INVENTION

In accordance with an aspect of the present invention, the mobile crane is equipped with means for the wireless reception of data identifying the location of the crane or with means for the determination of these data as well as with transmission means which are in communication with these means or can be connected to them, with the transmission means being designed such that they transmit the data identifying the location of the crane from the crane to a receiver in a wireless manner. The term "data identifying the location of the crane" is to be widely interpreted and includes every type of data which per se represent the location of the crane such as coordinates and also data which indirectly represent the location of the crane such as the GPS signals received by satellites based on which a determination of the location of the crane is carried out.

Due to the fact that the crane in accordance with this embodiment of the invention transmits data representing its location to a unit, for example to a center spatially remote from the crane, in a wireless manner, the crane can be located at any time. This can be used for the monitoring of the crane movements as well as efficient protection against theft.

The means by which the position at which the crane is located can be determined can be formed e.g. by a GPS receiver. Other methods for the determination of the location are naturally also conceivable. It is, for example, possible for the crane to transmit identifiers of one or more radio cells of a mobile phone network to a reception unit, for example to a center, based on which the area in which the crane is then currently located can then be determined.

Provision is made in a further embodiment of the invention for the crane to have a store in which the data identifying the location of the crane can be or are stored. If there is no possibility of a wireless transmission of data for a period of time, for instance because there is no network coverage of a mobile phone network, the data relating to the location of the crane which would have been transmitted if a connection were present can be buffered in a store in the crane for at least so long until the possibility of wireless communication is again present.

Provision is thus made in a further embodiment of the invention for the crane to have means for the determination of the connection quality or of the existence of the transmission path for the wireless transmission of data as well as a controller which is designed such that it instigates the storage of the data identifying the location of the crane in the store when the connection quality falls below a limit value or if no connection is present at all and which instigates the transmission of the stored data when the connection quality exceeds a limit value or is present again. The advantage thereby results that the location data of the crane are also present in full if the possibility of wireless transmission had temporarily not been given.

The present invention furthermore relates to a mobile crane having means for the wireless transmission of a software update signal to a software management unit as well as for the wireless reception of a response signal or having means for the wireless checking of a software management unit, having evaluation means for the evaluation of the response signal or of the result of the check as well as having reception means for the wireless reception of software. As already stated above, the software has a high priority within the framework of efficient crane operation. In this embodiment of the invention, the latest and thus optimum software is always available in the crane. Provision is made for this purpose for the crane to send a query signal to a software management unit, for example to a central server, and for the software management unit then to transmit a response signal to the crane from which it can be seen that new software is present which can be downloaded. The query signal can, for example, include data identifying the crane or also data identifying the latest software on the crane so that a check can be made on the part of the software management unit as to which software is suitable for the respective crane or whether the crane is equipped with the latest software or whether an update is required. It is also conceivable that the crane logs into the software management unit or makes a check there as to whether a software update is required.

If an update is required, the software is transmitted to the crane in a wireless manner by the software management unit or from another suitable position.

It is conceivable that the crane furthermore has means for the independent loading and installation of the software received by the reception unit. In a preferred embodiment of the invention, there is no need for the assistance of the crane operator. The crane rather preferably carries out the software update independently.

Provision is made in a further embodiment of the invention for the crane to be designed such that the wireless transmission of a software update signal or the wireless checking takes place at predetermined time intervals or at predetermined points in time. A time interval can thus be provided in the crane, for example. The crane automatically reports to a defined position based on this interval and checks for new or available software. It is possible in this connection for the crane to have detection means by means of which it can be detected when the time intervals or the points in time have not been observed.

Provision is made in a further embodiment of the invention for the crane to have means for the restriction or for the stopping of the crane operation which are in communication with or can be connected to the detection means and which are designed such that the crane operation is stopped or restricted when it is found by means of the detection means that the time intervals or the points in time have not been observed. If the crane does not report for software updating, it can, for example, be assumed that an improper use of the crane is ongoing, which can have the result that the crane can only be operated with restrictions or is shut down.

The present invention furthermore relates to a mobile crane having transmission means for the wireless transmission or for the provision of data relating to the maintenance and/or a problem of the crane for their wireless retrieval as well as having means for the wireless reception of diagnosis data or service data based on the data transmitted in a wireless manner.

It is, for example, conceivable that a wireless connection to a service center is established in the event that the crane has a problem. One or more diagnostic routines can be started there by competent personnel, defects can be recognized and the work capability can be established again, where necessary together with the customer on site. This embodiment of the invention does not only relate to the case of a crane problem, but also to the service case. It is, for example, conceivable that crane operating data are provided or transmitted on the part of the crane and that service intervals are determined in a service office based on these data and are sent to the crane.

The availability of the crane is thus increased for the customer and consequential costs of a longer crane downtime are avoided.

Provision is made in a further embodiment of the invention for the mobile crane to be equipped with means for the optical detection of the crane, of parts of the crane or for the optical detection of the crane working area as well as with transmission means by means of which data based on the optical detection can be transmitted to a predetermined unit in a wireless manner. It is, for example, possible in this manner to carry out a live observation of the work in a center spatially remote from the crane and to intervene from there where necessary.

Provision is made in a further embodiment of the invention for the crane to have means configured in the sense of a "black box" for the detection and storage of crane operating data as well as transmission means by means of which the stored crane operating data (logger data) can be transmitted to a predetermined position in a wireless manner. Logger data can, for example, be transmitted by radio to a central unit in this manner. These data can, for example, be utilized for analysis or for service purposes or can be stored in the central unit for any later use.

Provision is made in a further embodiment of the invention for the mobile crane to be equipped with transmission means for the wireless transmission of one or more signals as well as with test means by means of which a test can be made whether the signal or signals were emitted by the transmission means, with the test means being configured such that the crane operation is restricted or stopped for the case that it is found by means of the test means that the signal or signals were not emitted or were not emitted at a preset time. A decision can, for example, be made on this basis to shut the crane down or to restrict the crane operation if no signal was emitted by the crane and/or was received by a central position over a longer time period or at predetermined points in time.

It is conceivable that a pre-warning/some pre-information can precede the predetermined point in time or the ending of the time period and/or the shutting down of the crane or the restriction of the crane operation. It is thus possible for a pre-warning/some pre-information to be emitted and/or for a specific time period to pass between the predetermined point in time or the end of the time period and the restriction of the crane operation or the shutting down of the crane or similar measures provided that the crane has not emitted the named signal or not at the due time. The point in time at which a restriction of the crane operation is carried out or the crane is shut down can thus represent the last point in time in a time period with different escalation stages.

It is particularly advantageous for the named predetermined point in time or the end of the time interval and/or the time period between the predetermined point in time or the end of the time interval and the restriction or the stopping of the crane operation or other measures to be settable. It is, for example, possible for the crane to have to emit the named signals at specific variable time intervals or at specific variable points in time. It is conceivable for this value or values to be adjustable, i.e. variable by the manufacturer or the operator of the crane, for example. The time period up to the shutting down of the crane can thus, for example, be configured to be shorter in some cases. If the crane is operated in a district with a known higher frequency of theft, this can be of advantage for the operator of the crane.

It is possible in this manner to vary the inspection intervals or inspection points in time and/or the time period which lies between a negative test and the stopping or restricting of the crane operation.

The present invention furthermore relates to a method for the localization of a crane, which is characterized in that the location of the crane is detected or determined based on the data transmitted by means of the crane. Provision can be made in this connection for the crane itself to carry out a determination of its location and to transfer these data in a wireless manner or for the crane to transmit data in a wireless manner on the basis of which the determination of the location is carried out.

It is, for example, conceivable for the crane to have a GPS antenna by means of which GPS signals are received and for the crane to carry out a determination of location which is based on the received data and which is then transmitted to a receiver in a wireless manner.

The present invention furthermore relates to a method for the equipping of a mobile crane with software, in particular with a software update, with the crane transmitting an update signal to a software management unit and receiving a response signal from it, or with the crane carrying out a wireless check of a software management unit and then receiving software in a wireless manner in dependence on the response signal or in dependence on the check. If it is found that a software update is not required, a downloading of a software update can naturally remain undone. If it is, however, found that the crane is not yet equipped with the latest software version, this is transmitted to the crane in a wireless manner. Provision is preferably made for the crane to load and install the software received in a wireless manner independently.

The present invention furthermore relates to a method for the carrying out of a diagnosis and/or for the provision of service information for a mobile crane, with the crane transmitting data relating to the maintenance and/or a problem of the crane in a wireless manner to a diagnostic or service unit and/or providing these data for wireless retrieval by a diagnostic or service unit and then receiving diagnostic or service data determined in dependence on the data transmitted in a wireless manner. The diagnostic or service data can be determined in a center based on the data transmitted by the crane and then transmitted to the crane in a wireless manner. It is, for example, conceivable that data received by the crane and identifying a problem are sent by the crane to a center in a wireless manner and are evaluated there for the purpose of determining a diagnosis.

The invention furthermore relates to a method for the operation of a crane which is characterized in that the data transmitted by means of the crane and based on the optical detection or the crane operating data are utilized, further processed or stored for the operation of the crane.

The invention furthermore relates to a method for the operation of a crane, which is characterized in that the crane or a central determination unit, i.e. a determination unit not located at the crane, carries out a check whether the crane has emitted wireless signals at all or whether the crane has emitted wireless signals at the due time. If this is not the case, provision can be made for an influencing of the crane operation, for example the shutting down of the crane, to take place because it may be assumed that an improper utilization of the crane is present. As stated above, provision can be made that the time period until the crane operation is restricted or stopped is variable and can be changed by the user or manufacturer.

DESCRIPTION OF THE PREFERRED EMBODIMENTS

Further details and advantages of the invention will be explained in more detail with respect to a plurality of embodiments shown in the following.

The crane in accordance with the present embodiments has means for the setting up of a GSM connection. Instead of a wireless connection by GSM, other means are naturally also conceivable by means of which a wireless communication is possible such as the use of a W-LAN. The crane has means by means of which encoded or non-encoded data can be received and transmitted in a wireless manner.

In an embodiment, the crane has a GPS module by means of which the position at which the crane is located can be determined based on the data received by satellites. These positional data are transmitted permanently or at specific time intervals by the crane to a center, for example to a factory surveillance service, by means of which the movements of one or more cranes are observed. The position at which the crane is located is always known in this manner. This can be used as efficient protection against theft.

A time interval can be provided in the crane in an embodiment of the invention. If this time interval has run out, the crane automatically reports to a defined office and checks for new available software, i.e. the correct software. This can take place, for example, in that the crane sends a query signal to a central software management unit and evaluates a response signal or in that the crane logs into a software management unit or checks the presence of new software there. In the event that software to be loaded is found, it is loaded and installed independently by the crane without the crane operator having to intervene. The customer thus always has all the new options of the software available and does not need to look for an update itself. Provision can also be made here for it to be assumed that an illegal use is present when the crane has not reported for the purpose of software updating. In this case, a suitable method can be started in the crane, which can lead to the shutting down of the crane.

The crane can naturally in this case equally subsequently again be switched free for the customer.

Provision is made in a further embodiment of the invention, in the event that the mobile crane emits a problem signal, for the crane to be able to establish a connection to a service center. All the relevant diagnostic processes or algorithms can then be started on the part of the competent service personnel. In this process, the problem can be identified and a solution to the problem determined. The working capability of the crane can then be reestablished in a wireless manner or, if necessary, together with the operator. Provision can at least be made for a remedy or for a provision of a spare part to take place as fast as possible. The availability of the crane for the customer can be increased in this manner and consequential costs of a crane downtime are avoided.

A further advantage consists of required service work being able to be recognized and prepared at an early stage. Any preventive maintenance necessary outside the schedule can also be recognized and prepared, for example based on data transmitted on the part of the crane.

Provision can furthermore be made for the wireless connection from or to the crane to be configured such that crane work can be tracked live at a spatial distance from the crane, for example at a center or a surveillance station and such that it is possible to intervene as necessary. It is, for example, conceivable that special load cases can be observed and released as required. Influence can thus be taken on the crane operation from a surveillance station by the possibility of the wireless transmission of these data.

Since, however, a data transmission is also possible by radio, logger data can also be transmitted. These data can be utilized, for example, for analysis or for service purposes.

Figure 1:
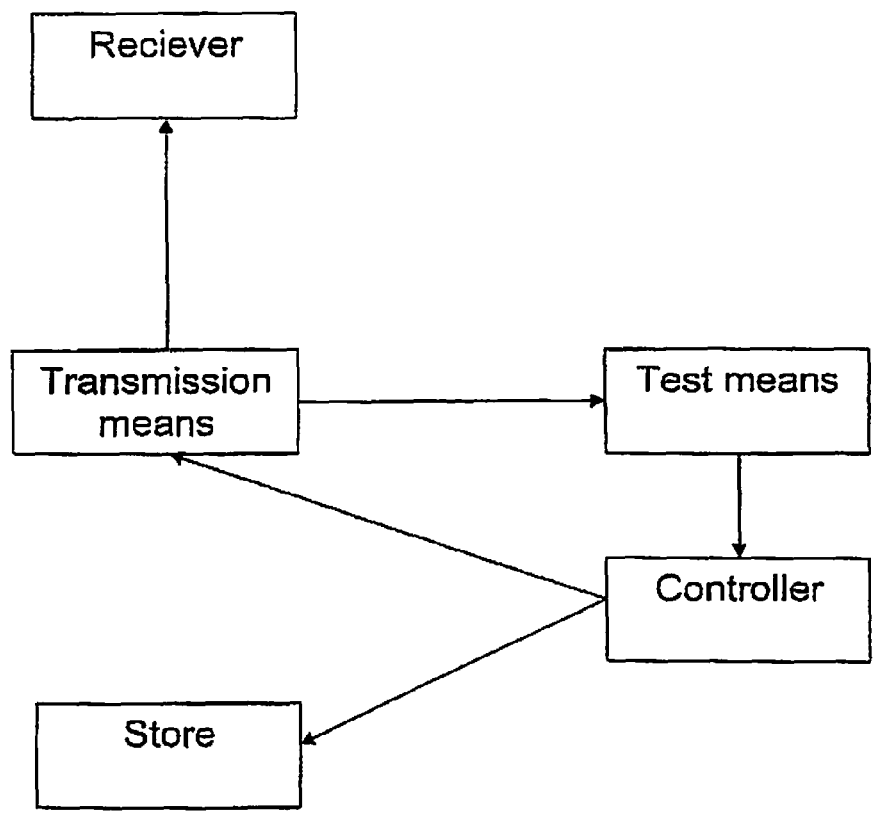
FIG. 1 is a diagram illustrating a mobile crane system and method according to an embodiment of the present invention.
Figure 2:
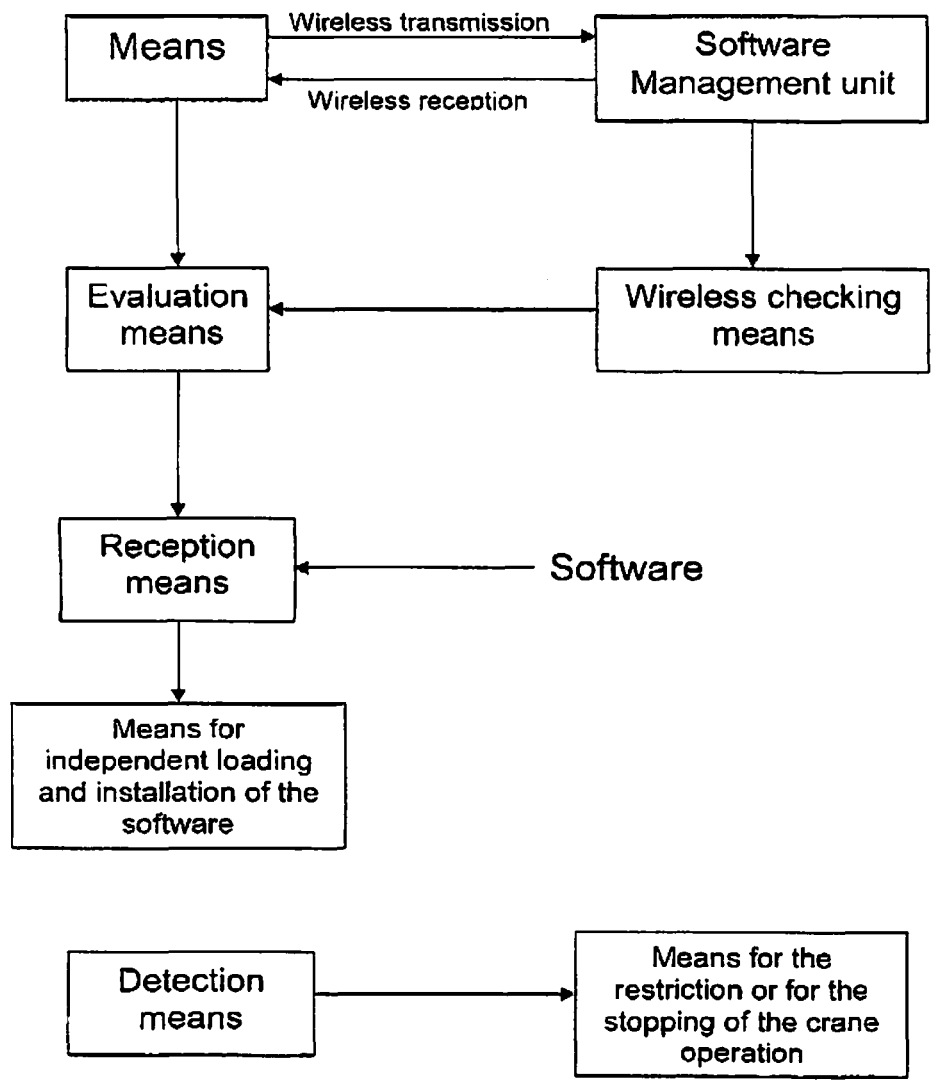
FIG. 2 is a diagram illustrating a mobile crane according to an embodiment of the present invention.
Figure 3:
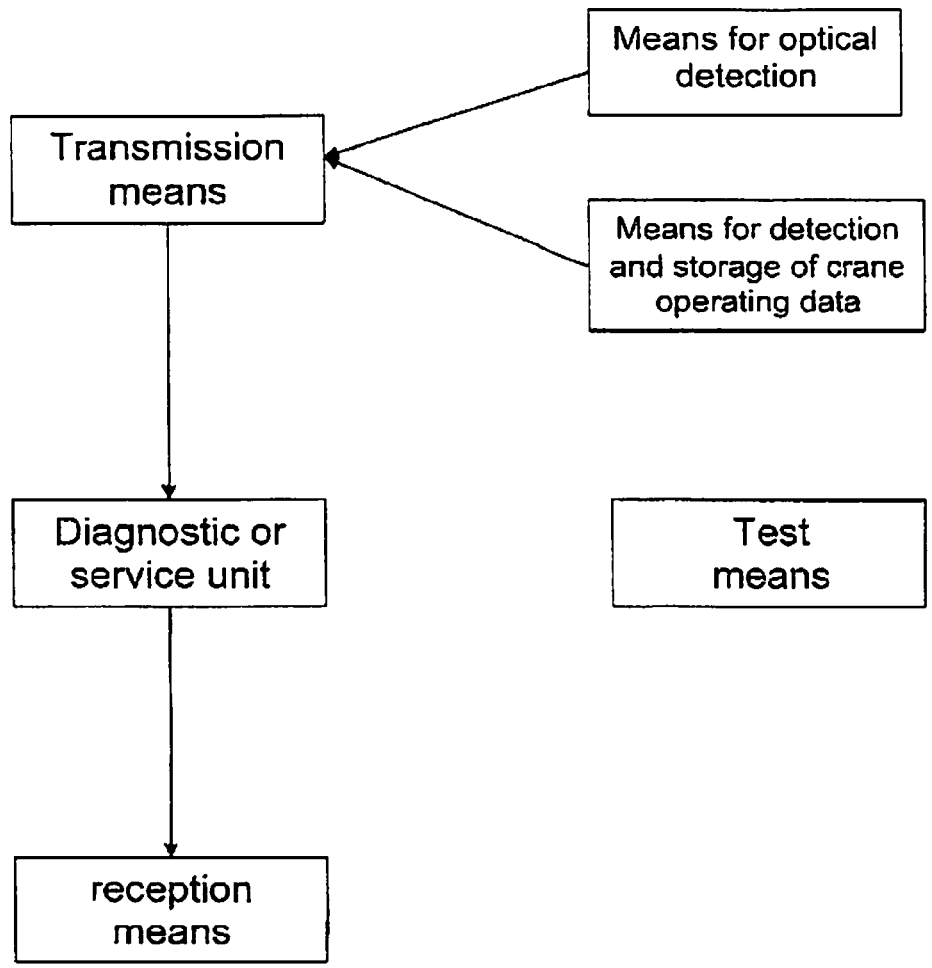
FIG. 3 is a diagram illustrating a mobile crane system and method according to an embodiment of the present invention.

The invention claimed is:

1. A mobile crane comprising:
    means for identifying a location of the crane by wireless reception of location data or by determination of location data;
    means for wirelessly transmitting the location data to a receiver in communication with or connectable to the wireless reception or determination of the location data;
    means for storing the location data;
    means for testing a connection quality and existence of a transmission path for the wireless transmission of location data from the crane to the receiver; and
    a controller configured to:
    initiate storage of the location data when the connection quality is below a limit value or when the connection does not exist, and
    initiate transmission of the stored location data when the connection quality exceeds a limit value or when there is a connection;
    wherein if a wireless signal is not transmitted or not transmitted in a specific period of time by the wirelessly transmitting means, the operation of the crane is restricted or stopped.

2. A mobile crane in accordance with claim 1, wherein the means for wireless reception or for the determination of data identifying the location of the crane include a GPS receiver.

3. A method for the localization of a crane in accordance with claim 1, wherein the location of the crane is detected or determined based on the data transmitted on the part of the crane and identifying the location of the crane.

4. A mobile crane, comprising:
    means for wirelessly transmitting a query signal to a software management unit or means for wirelessly checking the software management unit;
    means for receiving a response signal from a software management unit;
    means for evaluating the response signal; and
    means for wirelessly receiving software;
    wherein if a wireless signal is not transmitted or not transmitted in a specific period of time by the wirelessly transmitting means, the operation of the crane is restricted or stopped.

5. A mobile crane in accordance with claim 4, wherein the crane furthermore has means for the independent loading and installation of the software received by the receiving means.

6. A mobile crane in accordance with claim 4, wherein the crane is designed such that the wireless transmission of a software update signal or the wireless checking of the software management unit takes place at predetermined time intervals or at predetermined points in time.

7. A mobile crane in accordance with claim 6, wherein the crane has detection means by which it can be detected when the time intervals or the points in time were not observed.

8. A mobile crane in accordance with claim 7, wherein the crane has means for the restriction or for the stopping of the crane operation which are in communication with or can be connected to the detection means and which are designed such that the crane operation can be restricted or stopped when it is determined by means of the detection means that the time intervals or the points in time were not observed.

9. A method in accordance with claim 4, wherein the crane loads and installs the software received in a wireless manner independently.

10. A mobile crane, comprising:
means for wirelessly transmitting maintenance data relating to maintenance of the crane or problem data relating to a problem of the crane or means for providing wireless retrieval of the data;
means for wirelessly transmitting an operation signal; and
means for wirelessly receiving diagnostic data or service data based on the maintenance data or problem data;
wherein if a wireless signal is not transmitted or not transmitted in a specific period of time by the wirelessly transmitting means, the operation of the crane is restricted or stopped.

11. A method for the carrying out of a diagnosis and/or for the provision of service information for a mobile crane in accordance with claim 10, wherein the crane transmits data relating to the maintenance and/or a problem of the crane in a wireless manner to a diagnostic or service unit and/or provides these data for wireless retrieval by a diagnostic or service unit and then receives diagnostic or service data determined in dependence on the data transmitted in a wireless manner.

12. A method in accordance with claim 11, wherein the diagnostic or service data are determined in a center based on the data transmitted by the crane and are transmitted to the crane in a wireless manner.

13. A mobile crane, comprising:
means for optically detecting the crane, parts of the crane, or the crane working area; and
means for wirelessly transmitting data based on the optical detection;
wherein if a wireless signal is not transmitted or not transmitted in a specific period of time by the wirelessly transmitting means, the operation of the crane is restricted or stopped.

14. A method for the operation of a crane in accordance with claim 13, wherein the data transmitted by means of the crane and based on the optical detection or the crane operating data are utilized, further processed or stored for the operation of the crane.

15. A mobile crane, comprising:
means for wirelessly transmitting one or more signals; and
means for testing whether the one or more signals were emitted by the wireless transmission means;
wherein the testing means restrict or stop operation of the crane if the one or more signals were not emitted, were not emitted at a predetermined point in time, or were not emitted within a predetermined time period.

16. A mobile crane in accordance with claim 15, wherein the predetermined point in time or the time period or its ending and/or the time duration between the predetermined point in time or time period or its ending and the restriction or the stopping of the crane operation can be set.

17. A method for the operation of a crane, in particular of a crane in accordance with claim 15, wherein the crane or a determination unit carries out a check of whether the crane has transmitted wireless signals or whether the crane has transmitted wireless signals in due time.

18. A method in accordance with claim 17, wherein the crane operation is restricted or stopped when it is found by means of the crane or by the determination unit that the wireless signals were not emitted or were not emitted in due time.

19. A mobile crane, comprising:
means for wirelessly transmitting a query signal to a software management unit or means for wirelessly checking the software management unit,
wherein the wireless transmission of the query signal takes place at predetermined time intervals or at predetermined points in time;
means for wirelessly receiving a response signal from the software management unit or the result of the wireless check;
means for evaluating the response signal or the wireless check;
means for wirelessly receiving software;
means for detecting whether the query signal was transmitted at the predetermined time intervals or the predetermined points in time; and
means for restricting or stopping operation of the crane that are in communication with or connectable to the means for detecting;
wherein, if the query signal was not transmitted at the predetermined time intervals or the predetermined points in time, operation of the crane is restricted or stopped.

20. A method in a mobile crane having means for wireless transmission of a query signal to a software management unit or means for wirelessly checking the software management unit, means for wireless reception of a response signal from the software management unit or the result of the wireless check, means for evaluation of the response signal, means for wireless reception of software, means for detection of whether the query signal was transmitted, and means for restricting or stopping operation of the crane, the method comprising:
wirelessly transmitting the query signal at predetermined time intervals or at predetermined points in time;
detecting whether the query signal was transmitted at the predetermined time intervals or at the predetermined points in time; and
if the query signal was not transmitted at the predetermined time intervals or the predetermined points in time, restricting or stopping operation of the crane.

* * * * *